US000001475H

United States Statutory Invention Registration [19]

[11] Reg. Number: H1475

Newman et al.

[43] Published: Aug. 1, 1995

[54] PROCESS FOR HALOGENATING PARA-ALKYL STYRENE/ISOOLEFIN COPOLYMERS

[76] Inventors: Neil F. Newman, 21 Eagle Rd., Edison, N.J. 08820; Donald A. White, 3T Greenfield Gardens, Edison, N.J. 08837; Lawrence W. Flatley, 524 Andria Dr., Somerville, N.J. 08876; William M. Davis, 715 Saint Marks Ave., Westfield, N.J. 07090

[21] Appl. No.: 547,480

[22] Filed: Jul. 2, 1990

[51] Int. Cl.[6] ..... C08F 12/08; C08C 19/14

[52] U.S. Cl. ..... 525/333.4; 525/356

[58] Field of Search ..... 525/355

[56] References Cited

U.S. PATENT DOCUMENTS

| | | | |
|---|---|---|---|
| 3,145,187 | 8/1964 | Hankey et al. | 260/23 |
| 3,948,868 | 4/1976 | Powers | 260/80.7 |
| 4,074,035 | 2/1978 | Powers et al. | 526/185 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |

FOREIGN PATENT DOCUMENTS 344021 11/1989 European Pat. Off. .

*Primary Examiner*—Gary L. Geist
*Assistant Examiner*—Joseph D. Anthony

[57] ABSTRACT

A process for halogenating copolymers of an isoolefin having from 4 to 7 carbon atoms and a para-alkylstyrene in the melt phase is provided in which the halogenation reaction is performed in a continuous flow device, such as an extruder-reactor. Halogenated copolymers produced by the process are also provided.

56 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR HALOGENATING PARA-ALKYL STYRENE/ISOOLEFIN COPOLYMERS

BACKGROUND OF THE INVENTION

1. Field of the Invention

The present invention relates to a process for halogenating copolymers of an isoolefin and a para-alkylstyrene in the melt phase, and the halogenated copolymers produced by the process. 2. Description of Information Disclosures The preparation and use of copolymers of styrene and isobutylene are known. See, for example, U.S. Pat. No. 3,948,868; and U.S. Pat. No. 3,145,187.

U.S. Pat. No. 4,074,035 discloses the copolymerization of isobutylene and halomethylstyrene using vinyl benzyl chloride.

Halogenated copolymers of an isomonoolefin having from 4 to 7 carbon atoms and a para-alkylstyrene are disclosed in European patent application 89305395.9 filed May 26, 1989 (Publication No. 0344021 published Nov. 29, 1989 ) .

U.S. Pat. Nos., 4,513,116; 4,548,995 and 4,554,326 disclose processes for the halogenation of polymers in the melt phase in a continuous flow device.

It has now been found that halogenation of copolymers of an isoolefin having from 4 to 7 carbon atoms and a para-alkylstyrene in the melt phase in a continuous flow device produces halogenated copolymers having improved properties.

SUMMARY OF THE INVENTION

In accordance with the invention there is provided, a process for halogenating a polymer in the melt phase, which comprises contacting a copolymer of an isoolefin having from 4 to 7 carbon atoms and a para-alkylstyrene with a halogenating agent in a continuous flow reaction zone, at reaction conditions, to produce a halogenated copolymer of said isoolefin and said para-alkylstyrene, said halogenated copolymer comprising a para-haloalkyl group.

DETAILED DESCRIPTION OF THE INVENTION

The copolymers of an isoolefin and a para-alkyl styrene useful as starting material for the halogenation process of the present invention include copolymers of an isoolefin having from 4 to 7 carbon atoms and a para-alkylstyrene in which the copolymer has a substantially homogeneous compositional distribution, such as those described in European patent application 89305395.9 filed May 26, 1989, (Publication No. 0344021 published Nov. 29, 1989). The preferred isomonoolefin comprises isobutylene. The para-alkylstyrene moiety may range from about 0.5 weight percent to about 90 weight percent. For elastomeric copolymer products, the para-alkylstyrene moiety may range from about 0.5 weight percent to about 20 weight percent. The preferred para-alkylstyrene comprises para-methylstyrene. Suitable copolymers of an isomonoolefin and a para-alkylstyrene include copolymers having a number average molecular weight ($\overline{M}_n$) of at least about 25,000, preferably at least about 30,000, more preferably at least about 100,000. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, metal-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

The Halogenation Process

The copolymers of an isoolefin and a para-alkylstyrene of the type described above are halogenated in the melt phase in a reaction zone located in a continuous flow device by reaction with a halogenating agent.

When the copolymer to be subjected to halogenation contains associated or occluded water (e.g. moisture), the copolymer is, preferably, dried to remove at least a portion of the associated water. Furthermore, preferably, the copolymer feedstock used for the halogenation reaction comprises less than about 200 wppm unreacted monomeric para-alkylstyrene.

The copolymer of an isoolefin having from 4 to 7 carbon atoms and para-alkylstyrene, optionally and preferably predried, is reacted in the melt phase with a halogenating agent at a temperature ranging from about 80° C. to about 200° C., preferably from about 100° C. to about 180° C. to produce a halogenated copolymer having a para-haloalkyl group.

The halogen-containing copolymers of the present invention have a substantially homogeneous compositional distribution and include the para-alkylstyrene moiety represented by the formula:

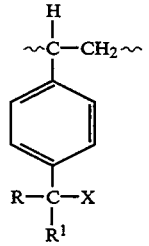

in which R and $R^1$ are independently selected from the group consisting of hydrogen, alkyl preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

The para-alkylstyrene moiety of these halogen-containing copolymer products may range from about 0.5 to about 90 weight percent, preferably from about 0.5 weight percent to about 20 weight percent, more preferably from about 1 to 20 weight percent of the copolymer. The halogen content of the preferred elastomeric copolymers may range from above zero to about 7.5 weight percent. The halogenating agent may be a gas, a liquid or a solid. Suitable halogenating agents are selected from the group consisting of chlorine gas; chlorine liquid; sulfuryl chloride; N-chlorosuccinimide; 1,3-bromo-5-5-dimethylhydantoin; bromine gas; bromine liquid; bromine chloride, sodium hypochlorite, sulfur bromide; N-bromosuccinimide, and mixtures thereof.

Preferably, the halogenating agent is selected from the group consisting of bromine gas, chlorine gas, and compounds which decompose to yield chlorine gas, bromine gas or mixtures thereof. The preferred halogenating agent is bromine gas. Thus, for example, bromine gas reacts with a copolymer of isobutylene and para-methylstyrene according to the following equation:

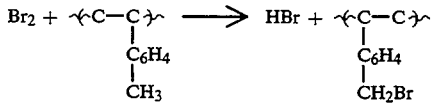

to yield a product whose primary functionality is the para-bromomethyl group. The gaseous halogenating agent may be diluted with other gases such as nitrogen or argon. A sufficient amount of halogen is introduced into the reaction zone to halogenate from about 1 to about 60 mole percent of the para-alkylstyrene content. Stated differently, when halogenating the preferred copolymer, that is, an elastomeric copolymer with up to about 20 weight percent para-alkylstyrene moieties, the halogenating agent is introduced into the halogenation reaction zone in an amount sufficient to produce a halogenated copolymer comprising from above zero to about 7.5 weight percent, preferably from about 0.25 to about 5 weight percent halogen, based on the total halogenated copolymer. The halogenation reaction may be conducted in the presence of an initiator, which may be a light or a suitable chemical initiator. Preferably, the halogenation reaction is conducted in the absence of an initiator. When a chemical initiator is used, the amount of initiator may range from about 0.02 to 1 weight percent, preferably from about 0.02 to 0.3 weight percent, based on the weight of the copolymer. The preferred chemical initiators are bis azo compounds and peroxides. It is preferred to avoid the use of metallic halogenation catalysts and polar diluents. The halogenation reaction of the present invention is selective and produces mainly the desired benzylic halogen functionality. A side reaction which may occur is disubstitution at the para-alkyl group to yield the dihalo derivative. Furthermore, since the para-alkylstyrene content can be varied over a wide range, it is possible to introduce a significant functionality range. The halogenated copolymers of this invention are, therefore, useful in subsequent reactions, for example, crosslinking reactions.

The preferred halogenated copolymer products of the process of the present invention are elastomers which have desirable properties such as impermeability, cureability, resistance to weather, ozone and chemical attack due to backbone saturation.

Since one mole HX, wherein X is chlorine or bromine, is produced for each mole of halogen reacted or substituted on the enchained para-alkylstyrene moiety, it is desirable to neutralize or otherwise remove this HX during the reaction or at least during polymer recovery in order to prevent it from causing undesirable side reactions or corrosion of equipment. Such neutralization and/or removal can be accomplished with a post reaction caustic wash, generally, using a molar excess of caustic based on the HX. Alternatively, neutralization can be accomplished by having a base (which is relatively non-reactive with the halogen) such as, for example, calcium carbonate powder present in dispersed form during the halogenation reaction to absorb the HX as it is produced. Removal of HX can also be accomplished by stripping with an inert gas, e.g. $N_2$, preferably at elevated temperatures. Final traces of HX may be neutralized by incorporation of a suitable base, e.g. calcium stearate into the stripped halogenated copolymer.

The halogenated neutralized copolymers of para-alkylstyrene and isoolefin of the present invention can be recovered and finished using conventional means with appropriate stabilizers being added to yield highly desirable and functional saturated halogenated copolymers suitable for many uses.

DESCRIPTION OF THE PREFERRED EMBODIMENT

The halogenation process of the present invention is conducted in an extruder-reactor. The extruder-reactor comprises various zones described below, namely:

(A) Feed Zone—in which polymer is introduced into the extruder-reactor in convenient form. This form includes, for example, particles and pellets of polymer as they are produced commercially, particles from bales of polymer which have been comminuted and crumb from the finishing line of a polymer manufacturing plant, each of which is preferably dry, but may contain a low level, e.g., above 0 to 15 weight percent, preferably about 3 to 5 weight percent, most preferably above 0 to 1 weight percent, of a solvent or diluent; the latter materials will be described more fully below. In this process, the use of water as a diluent is to be avoided in order to avoid corrosion.

The feed zone is designed to form the polymer feed into a cohesive mass and convey or pump the mass past a restrictive dam which follows the feed zone and distinguishes it from the reaction zone which follows. This operation should be conducted at low shear and temperature consistent with the desired result and at a pressure sufficient to convey the mass, typically up to about 600 psig, preferably up to about 400 psig, most preferably up to about 200 psig. Lower pressures are preferred in order to avoid overheating the polymer. This can be achieved, e.g., by utilizing an extruder screw with relatively deep flights and by keeping the length of the feed zone, i.e., the feed zone screw length, as short as possible commensurate with desired production rates. For example, polymer is introduced at about room temperature and exits from the feed zone at about 60° to 150° C.

A restrictive dam is used to separate the feed zone from the reaction zone which follows it so as to prevent back-leakage of reactants. This dam is not restrictive enough, however, to cause excessive overheating of the polymer. A restrictive dam can be, for example, a reverse flighted screw section, a filled screw section, a shallow flighted screw section, an unflighted screw section, combinations thereof, or other means known in the art. If an unflighted screw section is employed, it can have a larger diameter than the root diameter upstream of it, for example 5-25% larger, but not greater than the screw flight diameter. The restrictive dam length may range from about 0.1 to about 5 screw diameters, preferably from about 0.2 to about 2 screw diameters, more preferably from about 0.25 to about 1 screw diameters in length. If a reverse flighted screw section is employed, it can be single or multi-flighted, preferably multi-flighted.

It should be noted that where the restrictive dam configuration employed is more than a mere separation boundary or region between zones, for example, more than merely an unflighted screw section, the restrictive dam can be considered to be part of the reaction zone itself, for example when a single or multi-flighted reverse flighted screw section is employed. Under such circumstances, the restrictive dam in the region of the extruder-reactor can be a part of or comprise the reaction zone.

In addition to the polymer which is introduced into the feed zone, an optional diluent may also be added. A diluent can function to reduce the viscosity of the polymer to a level commensurate with subsequent good mixing and halogenation without the necessity for excessive heat and a risk of molecular weight breakdown and undesirable side reactions; it can also function to reduce the temperature of the polymer. The diluent may be volatile saturated hydrocarbon, chlorohydrocarbon or chlorocarbon such as pentane, hexane, methylene chloride, chloroform, or carbon tetrachloride. It may also be a non-hydrocarbon, readily removable from the system downstream, but able to perform the function of temporarily reducing the apparent viscosity of the polymer in the reaction zone. Examples of suitable materials include inert gases such as nitrogen and argon, as well as gases such as carbon dioxide and air.

The diluent may also be retained with or in the polymer, such as a hydrocarbon oil. Suitable oils include saturated aliphatic oil and rubber process oils such as paraffinic, naphthenic and aromatic types. Where such oils are utilized, the halogenated polymer would contain oil after recovery and drying and would commonly be referred to as "oil extended". Oil extended polymer is well known in the art and various grades are commercially available. Such products are particularly useful where it is desirable, for example, to extend the polymer with high levels of filler, e.g., carbon black or mineral filler, to obtain properties from high molecular weight polymer which might otherwise be difficult to process because of its inherently high viscosity, etc.

The total amount of diluent, including that which may be present in the feed should not be greater than about 50 weight percent based on the polymer, preferably less than about 15 weight percent, most preferably about 5 to about 10 weight percent.

(B) Reaction Zone—can generally be described as the zone in which the halogenating agent is caused to react with the polymer to effect the halogenation reaction while simultaneously minimizing undesired side reactions. Screw configuration in the reaction zone is important to mixing efficiency and achievement of the overall objectives of the process. The configuration should be such as to cause disruption and reorientation of the flow of polymer, as, for example, by the aforementioned use of reverse flights, multiple reverse flights, pin sections, a series of very short alternating reverse and forward screw sections, multiple flight, interrupted flight sections and combinations thereof, and other designs known in the art to improve mixing. Viscosity control of the polymer, effected in part, by the use of an optional diluent and by control of the molecular weight of the polymer and the polymer temperature as it enters the reaction zone, also determines, to a large extent, deformability. Selection of the temperature level influences the reaction and along with residence time in the reaction zone, the nature of the end product. For maximum economy and continuity of production, the choice of materials of construction of the reaction zone is particularly important; this also influences the type and level of potential contaminants in the finished polymer and their influence on long-term storage stability of the polymer as well as chemical reactivity.

Control is required in order to avoid over and under halogenation. This can be achieved by, for example, controlling the halogen feed rate in comparison to the copolymer feed rate, design of the reaction zone (length, screw features and configuration, injection means, temperature, etc.) and RPM so as to determine time of reaction and to control the relative rates of the desired reaction versus competing side reactions.

The halogenating agent can be gaseous, liquid or solid and may be added either in a pure state or diluted with a suitable inert fluid as noted above. Suitable halogenating agents include chlorine, sulfuryl chloride, N-chlorosuccinimide, 1,3-dichloro-5,5-dimethylhydantoin, bromine, bromine chloride, sodium hypochlorite, sulfur bromide and N-bromosuccinimide. Where gaseous chlorine, bromine or bromine chloride is used, gaseous diluents, e.g., nitrogen, argon, air, $CO_2$ etc., can be used when a diluent is desired. Preferably, gaseous molecular chlorine or gaseous bromine or compounds which decompose to yield chlorine gas or bromine gas are used as halogenating agents. Mixtures of any of these halogenation agents may also be used. The most preferred halogenating agent is gaseous molecular bromine.

Alternative reaction zone mixing techniques are feasible. The reaction can be allowed to occur at the continuously renewing polymer surface generated by the configuration of the reaction zone and conveying means, e.g., the extruder screw and barrel, in a reaction zone partially filled with polymer. Configuration of the screw and chamber walls should not be so restrictive as to cause excessive pressure and excessive shear heating of the polymer. Pressure at the point of injection need not be very high where the reaction zone is only partially filled with polymer and preferably vented. In addition, injection can be into the space occupied by the halogenating agent, e.g., the vapor space. A moderately positive injection pressure is suitable; the pressure selected should maintain a positive flow into the reaction zone and prevent plugging of the line. The specific pressure chosen is a matter of operating convenience. In the partially filled system, pressure at the point of injection is about 15 to about 400 psig, preferably 100 to about 300 psig.

Also important for achieving efficient reaction of the polymer and halogenating agent is the incorporation in the reaction zone of means to produce the level of polymer mixing and surface disruption preferred for the practice of this invention. As described earlier, this can be achieved, for example, by utilizing reverse or broken flights on the reaction zone portion of the extruder screw. Other means include operation of the screw at a rotation rate of about 50 to about 600 RPM, preferably about 70 to about 400 RPM, most preferably about 90 to about 200 RPM, and by incorporation of a downstream restrictive dam, of the type described above to separate the reaction zone from the stripping and/or neutralization zone which follows it.

Characterization of mixing can be had by reference to the "scale of segregation" achieved between the halogenating agent and polymer (generally, any two-phase system). A preferred scale of segregation in the practice of this invention is less than 50 microns, more preferably less than 30 microns, most preferably less than 10 microns. Characterization of the degree of mixing in a two-phase system referred to herein is in accordance with the method described in the text, *Principles of Polymer Processing*, Z. TADMOR and C. G. GOGOS (John Wiley and Sons, 1979), Section 7.5, pages 209 ff.

Overall, it is desirable, by control of polymer viscosity, chamber and screw design, screw RPM, and operating pressure, to prevent excessive temperatures in the reaction zone while maintaining a high level of mixing. It is desirable that the temperature be less than about 180° C.

(C) Stripping Zone—in which by-product HCl and/or HBr and unreacted volatile halogenating agent (e.g. chlorine or bromine) are stripped to suppress undesirable side reactions and corrosion of the equipment. Suitable means to effect stripping and remove residual unreacted halogenating reagent in this process is the injection of an inert gas into the extruder to "sweep out" by-products and residual halogenating agent. As discussed earlier, multiple injection sites can be used as well as a supplementary injection zone. In another embodiment, pressure in the system is controlled in order to remove the unwanted products.

The stripping zone is designed so that the inert gas contacts the reaction products from the reaction zone as soon as possible after the halogenation reaction. This is achieved by utilizing a dam, between the reaction and stripping zones, which is as short as possible consistent with its functioning as a restrictive dam. The injection port for the inert gas can be located as close as possible to the downstream end of the dam. Additional stripping agent can be injected so as to flow countercurrently to the flow of the halogenated product mixture.

Polymer stabilizing agents can, optionally, be added in this zone. This can be done by incorporating the stabilizers at an injection point.

In the practice of this invention, attention should be given to the temperature of the stripping agent streams when they are brought into contact with the halogenated polymer product so as not to subject the polymer to excessive cooling and increase in viscosity. Methods for preheating these streams and the temperatures and pressures which are required in order to maintain a continuous process are well within the abilities of those skilled in the polymer processing art.

The stripping zone preferably comprises a multiplicity of individual stripping zones, separated from one another by restrictive dams. The individual stripping zones are preferably operated independently of one another. Each may have its own conditions of temperature, pressure, stripping agent flow rate. These individual paramaters are chosen to minimize the level of unreacted volatile halogenating agent and hydrogen halide coproduct in the polymer leaving from the stripping zone as a whole.

(D) Exit Zone—Preferably the extruder-reactor comprises a final exit zone in which the temperature of the halogenated polymer product is adjusted for delivery therefrom below about 130° C, more preferably below about 120° C and most preferably below about 100° C, as a contribution to the stability of the polymer. Also in the exit zone, stabilizer(s) may initially be added to the neutralized, halogenated polymer product if not added in the neutralization or stripping zone, or additional stabilizer(s) can be added.

Suitable stabilizers for use in this process include slurries or solutions of butylated hydroxytoluene (BHT), calcium stearate, sodium stearate, multi-component stabilization systems such as those described in U.S. Patent No. 4,130,519 to Roper et al., incorporated herein by reference, and other degradation and or oxidation inhibitors well known in the art directed to the polymer being halogenated.

In addition to the extruder-reactor features just described, the process of this invention can also incorporate filter means known in the art to effect the separation of undispersed materials from the polymer, screw means of suitable configuration, as described above, transversing zones (A)–(D) inclusive to effect properly the operations disclosed in said zones (including single and twin screws), a system for recycling any organic diluent that may be added to the feed zone and/or included with the halogenating agent and, optionally, means for back-mixing the extruded halogenated polymer to assure that the final packaged polymer is a homogeneous product.

Materials of construction are a significant consideration in the process herein since potentially corrosive reagents are employed. In addition to a concern for long equipment life, product stability needs to be considered if by-products of the corrosion process become incorporated into the polymer. In addition, halogenation chemistry can be affected if metals and corrosion by-products are present during the halogenation reaction. Materials of construction in the feed zone, reaction zone and neutralization zone are selected to prevent or minimize reaction of the equipment with the halogenating agent and the reaction by-products. Small amounts of such materials may cause undesirable side reactions to occur with various constituents of the polymer. Useful materials include those alloys known commercially as Hastelloy ®, steels coated with inert polymers such as fluorocarbons, ceramics, etc.

Another advantage for this process is that in the absence of aqueous streams, a dry, halogenated product is produced which can be used immediately or packaged (after cooling, if required). Additionally, the corrosion noted above is significantly reduced or may be eliminated.

The halogenated copolymers of the present invention may be processed in standard equipment used for rubber such as internal mixers. These halogenated copolymers are amenable to conventional compounding practice and various fillers and extenders can be incorporated, e.g., carbon blacks, clays, silicas, carbonates, oils, resins, waxes, etc., to produce a composition. The halogenated copolymers of the present invention can be cured alone or a composition comprising a halogenated copolymer of the present invention and fillers and/or rubber compounding additives may be cured to produce cured compositions of the present invention.

The halogenated copolymers produced by the process of the invention may be cured or vulcanized by any of the prior art methods suitable for saturated halogenated polymers, e.g., zinc oxide alone or with various promoters. Curing is usually accomplished at a temperature ranging from about 140° C to about 250° C, preferably from about 150° C to about 200° C, and usually takes from 1 to 150 minutes.

The following examples are presented to illustrate the invention. Unless otherwise indicated, all parts and percentages herein are by weight.

EXAMPLES I TO VIII

The copolymer of isobutylene and para-methylstyrene used in these examples had a para-methylstyrene content of about 4.4 percent by weight (2.1 mole percent), a Mooney viscosity of about 50 (ML, 1+8, 125 ° C) and was predried to a uniform and low moisture level. The halogenating agent was bromine gas diluted with nitrogen. Nitrogen was also used as the stripping agent.

The reaction was performed in an extruder-reactor with 2 inch diameter twin screws, counterrotating and nonintermeshing. The overall length to diameter (L/D) ratio was 54. A dam at about L/D=6 separated the feed zone from the reaction zone. The reaction zone extended to about L/D =36 and was followed by the first (to about L/D=42) and second (to about L/D=48) stripping zones, which were separated by a second dam. Both stripping zones were equipped with a vent through which the vented gases were conducted to a caustic scrubber to remove unreacted bromine as well as coproduct hydrogen bromide. Beyond the stripping zones, the remainder of the extruder constituted the exit zone.

The copolymer feed rate was 50 kg/h. For the nitrogen used for bromine dilution, the feed rate was 0.5 kg/h. For nitrogen used as a stripping agent, the feed rate was 3.4 kg/h. The nitrogen diluted bromine gas was injected into the reaction zone at about L/D=7.5. The stripping nitrogen was injected at the end of the second stripping zone and flowed countercurrently to the polymer flow, exiting through the second vent. In the exit zone, a suspension of calcium stearate (50 percent by weight) in rubber process oil (Flexon ®815) was fed as a stabilizer at a rate of 1.0 kg/h (total suspension).

Various bromine feed rates and two reaction zone temperatures were used as indicated in Table I. The products were analyzed as follows and the results are shown in Table I. Total bromine content was determined by X-ray fluorescence spectroscopy (XRF) . Unbrominated, monobrominated and dibrominated para-methylstyrene groups (shown as PMS, BrPMS and $Br_2$PMS, respectively) were determined by $^1$H-nuclear magnetic resonance spectroscopy (NMR) . Mooney viscosity (ML, 1+8, 125° C) was measured according to ASTM D 1646. Stearic acid formed by the reaction of unstripped hydrogen bromide with the calcium stearate was measured by infrared spectroscopy (IR).

The analytical data in Table I show that bromination of the feed copolymer occurred mainly at the para-methyl group as desired. At the two temperatures used yields were comparable, but stripping of coproduct hydrogen bromide was more efficient at the higher temperature as evidenced by the lower product stearic acid content, at any given bromine feed level.

Not all of the total bromine found by XRF can be accounted for by the sum of the brominated and dibrominated para-methylstyrene groups found by NMR and the calcium bromide equivalent to the stearic acid found by IR. This suggests the presence of brominated polymer structures other than brominated para-methylstyrene units. The nature of these structures is not clear, but their formation may be associated with the drop in Mooney viscosity that occured during this process. This constitutes a difference between the product of the present process and that of the bromination conducted in solution. An additional difference was the occurrence of dibromination at the para-methylstyrene group at low levels of bromination.

The utility of the products of the present invention is shown by the cure data in Table I. These results were obtained by mixing the following compositions on a rubber mill.

| | |
|---|---|
| The product of the example indicated | 100 parts |
| International reference carbon black #6 | 40 parts |
| Zinc oxide | 1 part |
| Stearic acid | 2 parts |
| Calcium stearate | 0.5 parts |

The cure behavior of these compositions was evaluated using a Monsanto rheometer at 160° C. with an arc setting of 3° . The time required for a 2 point rise in torque above the minimum torque ("scorch time") and the increase in torque above minimum after 30 minutes are shown in Table I as Ts2 and M30-ML, respectively.

An important property advantage of the products of the present invention is that they have no unsaturation and are, therefore, resistant to attack by atmospheric ozone. As these products will most often be used in cured compounds rather than in the uncured, uncompounded state, it is important that their ozone resistance carries through to such cured compounds. Compounds were made, with compositions as shown above, using three of the products from the examples and, for the purpose of comparison, from a brominated isobutylene/isoprene copolymer with a bromine content of about 2.1 percent by weight and Mooney viscosity of about 37 (ML, 1+8, 125° C.), herein designated Copolymer A. These four compounds were cured at 160° C. for 60 minutes. The four cured compounds were treated with ozone (100 pphm) at 40° C., in both dynamic, tensile elongation (according to ASTM D 3395) and static, bent loop (according to ASTM D 1149) modes. The results are shown in Table II. Since the products of the present invention have substantially no unsaturation, the cured compounds made from them did not crack or break in both static and dynamic modes. The cured compound made from Copolymer A did not perform as well in these tests.

Examples I to VIII are examples of the present invention. The halogenated copolymers produced in Examples I to VIII are products of the present invention. The cured compositions made from the products of Examples I to VIII are products of the present invention. The cured composition made from Copolymer A is not a product of the invention.

TABLE I

| | | | PRODUCT ANALYSIS | | | | | | CURE DATA | |
|---|---|---|---|---|---|---|---|---|---|---|
| EX. | Br2 Rate kg/h | TEMP., deg C. | Br wt % XRF | PMS mole % NMR | BrPMS mole % NMR | Br2PMS mole % NMR | MOONEY | STEARIC ACID wt. % IR | Ts2 min | M30-ML in-lb. |
| I | 0.80 | 160 | 1.01 | 1.62 | 0.40 | 0.03 | 43 | 0.42 | 8.3 | 6.4 |
| II | 1.10 | 160 | 1.27 | 1.56 | 0.52 | 0.08 | 46 | 0.48 | 7.0 | 9.1 |
| III | 1.30 | 160 | 1.42 | 1.55 | 0.52 | 0.08 | 36 | 0.56 | 5.0 | 15.3 |
| IV | 1.75 | 160 | 1.77 | 1.50 | 0.64 | 0.08 | 31 | 0.66 | 5.3 | 23.4 |
| V | 0.90 | 120 | 1.09 | 1.66 | 0.39 | 0.05 | 36 | 0.57 | 7.0 | 6.5 |
| VI | 1.20 | 120 | 1.45 | 1.47 | 0.54 | 0.07 | 38 | 0.56 | 4.9 | 16.5 |
| VII | 1.35 | 120 | 1.49 | 1.48 | 0.53 | 0.10 | 33 | 0.70 | 4.9 | 14.6 |
| VIII | 1.75 | 120 | 1.75 | 1.46 | 0.58 | 0.11 | 34 | 0.69 | 4.0 | 14.8 |

TABLE II

| | Halogenated Copolymer | | | |
|---|---|---|---|---|
| Ozone Resistance, 40° C. 100 pphm Ozone | COPOLYMER A | FROM EXAMPLE II | FROM EXAMPLE III | FROM EXAMPLE VIII |
| Dynamic, 20% Extension | | | | |
| Hours to Crack | <24 | >216 | >216 | >216 |
| Hours to Break | 96 | >216 | >216 | >216 |
| Static, Bent Loop | | | | |
| Hours to Crack | <24 | >216 | >216 | >216 |
| Hours to Break | 192 | >216 | >216 | >216 |

What is claimed is:

1. A process for halogenating a polymer in the melt phase, which comprises: contacting a copolymer of an isoolefin having from 4 to 7 carbon atoms and a para-alkylstyrene with a halogenating agent, in a continuous flow device, at reaction conditions, in a reaction zone, to produce a halogenated copolymer of said isoolefin and said para-alkylstyrene, said halogenated copolymer comprising a para-haloalkyl group.

2. The process of claim 1 wherein said reaction is conducted in the presence of an initiator selected from the group consisting of light, chemical initiators and mixtures thereof.

3. The halogenated copolymer produced according to the process of claim 2.

4. The cured halogenated copolymer of claim 3.

5. A composition comprising the cured halogenated copolymer of claim 4.

6. The cured halogenated copolymer of claim 4.

7. The process of claim 1, wherein said reaction conditions, in said reaction zone, include a temperature ranging from about 80° to about 200° C.

8. The halogenated copolymer produced according to the process of claim 7.

9. A composition comprising the cured halogenated copolymer of claim 8.

10. The process of claim 1 wherein said halogenating agent is selected from the group consisting of chlorine gas, chloride liquid; sulfuryl chloride; N-chlorosuccinimide; 1,3-dibromo-5,5-dimethylhydantoin; bromine gas; bromine liquid; bromine chloride; sodium hypochlorite;

sulfur bromide; N-bromosuccinimide, and mixtures thereof.

11. The halogenated copolymer produced according to the process of claim 10.

12. The cured halogenated copolymer of claim 11.

13. A composition comprising the cured halogenated copolymer of claim 12.

14. The process of claim 1 wherein said halogenating agent is selected from the group consisting of bromine gas, chlorine gas, compounds which decompose to yield bromine gas and mixtures thereof.

15. The halogenated copolymer produced according to the process of claim 14.

16. The cured halogenated copolymer of claim 15.

17. A composition comprising the cured halogenated copolymer of claim 16.

18. The process of claim 1, wherein said halogenated copolymer comprises from above zero to about 7.5 weight percent chemically bound halogen, based on the total halogenated copolymer.

19. The halogenated copolymer produced according to the process of claim 18.

20. The cured halogenated copolymer of claim 19.

21. A composition comprising the cured halogenated composition of claim 20.

22. The process of claim 1, wherein said halogenated copolymer comprises from about 0.25 to about 5 weight percent chemically bound halogen, based on the total halogenated copolymer.

23. The halogenated copolymer produced according to the process of claim 22.

24. The cured halogenated copolymer of claim 23.

25. A composition comprising the cured halogenated composition of claim 24.

26. The process of claim 1 wherein said isoolefin is isobutylene, said para-alkylstyrene is para-methylstyrene, and said halogenated copolymer is isobutylene-para-halomethylstyrene.

27. The process of claim 26, wherein said halogenating agent is bromine and wherein said halogenated copolymer is isobutylene-para-bromomethylstyrene.

28. The halogenated copolymer produced according to the process of claim 27.

29. The cured halogenated copolymer of claim 28.

30. A composition comprising the cured halogenated copolymer of claim 29.

31. The halogenated copolymer produced according to the process of claim 26.

32. The cured halogenated copolymer of claim 31.

33. A composition comprising the cured halogenated copolymer of claim 32.

34. The process of claim 1 wherein said copolymer has a number average molecular weight of at least 25,000.

35. The halogenated copolymer produced according to the process of claim 34.

36. The cured halogenated copolymer of claim 35.

37. A composition comprising the cured halogenated copolymer of claim 36.

38. The process of claim 1 wherein said copolymer comprises from about 0.5 to about 90 weight percent of said para-alkylstyrene.

39. The halogenated copolymer produced according to the process of claim 38.

40. The cured halogenated copolymer of claim 39.

41. A composition comprising the cured halogenated copolymer of claim 40.

42. The process of claim 1, wherein said copolymer comprises from about 0.5 to about 20 weight percent of said para-alkylstyrene.

43. The halogenated copolymer produced according to the process of claim 42.

44. The cured halogenated copolymer of claim 43.

45. A composition comprising the cured halogenated copolymer of claim 44.

46. The process of claim 1, wherein said continuous flow device comprises means for conveying said copolymer through said device wherein said copolymer and said halogenating agent are subjected to deformation, and means for disengaging by-product of the reaction and unreacted halogenating agent from said halogenated copolymer, said means comprising means for injecting an inert gas into said continuous flow device downstream of said contacting step to strip said by-product and said unreacted halogenating agent from said halogenated copolymer.

47. The halogenated copolymer produced according to the process of claim 46.

48. The cured halogenated copolymer of claim 47.

49. A composition comprising the cured halogenated copolymer of claim 48.

50. The process of claim 1, wherein said copolymer and said halogenating agent are present during said contacting step as either co-continuous phases or wherein said halogenating agent is present as a continuous phase and said polymer is present as a discontinuous phase or wherein the zone in which said polymer and said halogenating agent are contacted is filled with said copolymer.

51. The halogenated copolymer produced according to the process of claim 50.

52. The cured halogenated copolymer of claim 51.

53. A composition comprising the cured halogenated copolymer of claim 52.

54. The halogenated copolymer produced according to the process of claim 1.

55. The cured halogenated copolymer of claim 54.

56. A composition comprising the cured halogenated copolymer of claim 55.

* * * * *